(12) United States Patent
Hiramatsu (10) Patent No.: US 9,467,581 B2
(45) Date of Patent: Oct. 11, 2016

(54) COMMUNICATION APPARATUS, CONTROL METHOD FOR COMMUNICATION APPARATUS, AND STORAGE MEDIUM

(71) Applicant: CANON KABUSHIKI KAISHA, Tokyo (JP)

(72) Inventor: Tomoki Hiramatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/161,525

(22) Filed: Jan. 22, 2014

(65) Prior Publication Data

US 2014/0211024 A1 Jul. 31, 2014

(30) Foreign Application Priority Data

Jan. 25, 2013 (JP) ................. 2013-012132

(51) Int. Cl.
*H04N 1/00* (2006.01)
*H04N 5/232* (2006.01)
*H04N 1/32* (2006.01)

(52) U.S. Cl.
CPC ...... *H04N 1/00204* (2013.01); *H04N 1/00209* (2013.01); *H04N 1/00233* (2013.01); *H04N 1/00251* (2013.01); *H04N 1/32117* (2013.01); *H04N 5/23206* (2013.01); *H04N 2201/0015* (2013.01); *H04N 2201/0084* (2013.01); *H04N 2201/325* (2013.01); *H04N 2201/3226* (2013.01); *H04N 2201/3247* (2013.01); *H04N 2201/3273* (2013.01); *H04N 2201/3278* (2013.01)

(58) Field of Classification Search
CPC ..................... H04N 1/00204; H04N 1/00209; H04N 1/00214; H04N 1/0023; H04N 1/00233; H04N 1/00251; H04N 2201/3226; H04N 5/23206

See application file for complete search history.

(56) References Cited

U.S. PATENT DOCUMENTS

| | | | |
|---|---|---|---|
| 7,327,387 B2* | 2/2008 | Tanaka et al. | 348/207.99 |
| 7,664,342 B2* | 2/2010 | Kuwata et al. | 382/305 |
| 2003/0227468 A1 | 12/2003 | Takeda | |
| 2004/0064834 A1* | 4/2004 | Kuwata et al. | 725/86 |
| 2008/0052945 A1* | 3/2008 | Matas et al. | 34/173 |
| 2008/0301586 A1* | 12/2008 | Ayatsuka | G06F 17/30274 715/840 |

* cited by examiner

*Primary Examiner* — Daniel M Pasiewicz
(74) *Attorney, Agent, or Firm* — Canon USA, Inc. I.P. Division (57) ABSTRACT

A communication apparatus stores a plurality of pieces of image data including grouped image data. The communication apparatus transmits, to another communication apparatus, information of representative image data out of the grouped image data, and information indicating a number of pieces of image data contained in the group, in response to a request from the other communication apparatus.

11 Claims, 8 Drawing Sheets

COMMUNICATION APPARATUS, CONTROL METHOD FOR COMMUNICATION APPARATUS, AND STORAGE MEDIUM

BACKGROUND

1. Field of the Disclosure

Aspects of the present invention generally relate to a communication apparatus, a control method for a communication apparatus, and a storage medium.

2. Description of the Related Art

In recent years, displaying a list of image data stored in an imaging apparatus such as a digital camera, in a communication device such as a personal computer (PC) or a smart device, and allowing a user to browse it is generally performed. Further, as the capacity of a memory provided on an imaging apparatus increases, a number of pieces of image data stored in the imaging apparatus are increased. For this reason, in a case where all the image data stored in the imaging apparatus is displayed as a list by a communication device, there is a problem that display becomes complicated. To solve such a problem, US 2003/0227468 discusses a method for grouping a plurality of pieces of image data based on incident information of the image data, and displaying for each group.

With the conventional technology, however, although a plurality of pieces of image data is grouped, because the communication apparatus acquires all the image data within a group from the imaging apparatus, a traffic for acquisition of the image data increases, and much time will be spent wastefully. Further, a memory of the communication apparatus will be used to store unnecessary image data, and thus limited resources will be wastefully used.

SUMMARY

According to an aspect of the present invention, a communication apparatus includes a determination unit configured to determine a role of whether the communication apparatus operates as an apparatus that constructs a network with other communication apparatus, or operates as an apparatus that participates in a constructed network, a communication unit configured to communicate with the other communication apparatus according to the role determined by the determination unit, a storage unit configured to store a plurality of pieces of image data including grouped image data, and a transmission unit configured to transmit, to the other communication apparatus, information of representative image data out of the grouped image data, and information indicating a number of pieces of image data contained in the group, in response to a request from the other communication apparatus.

Further features of the present invention will become apparent from the following description of exemplary embodiments with reference to the attached drawings.

DESCRIPTION OF THE EMBODIMENTS

An exemplary embodiment of the present invention will be described below. The technical scope of the present invention is defined by claims, and it is not intended to be limited by individual exemplary embodiments described below.

Figure 1:
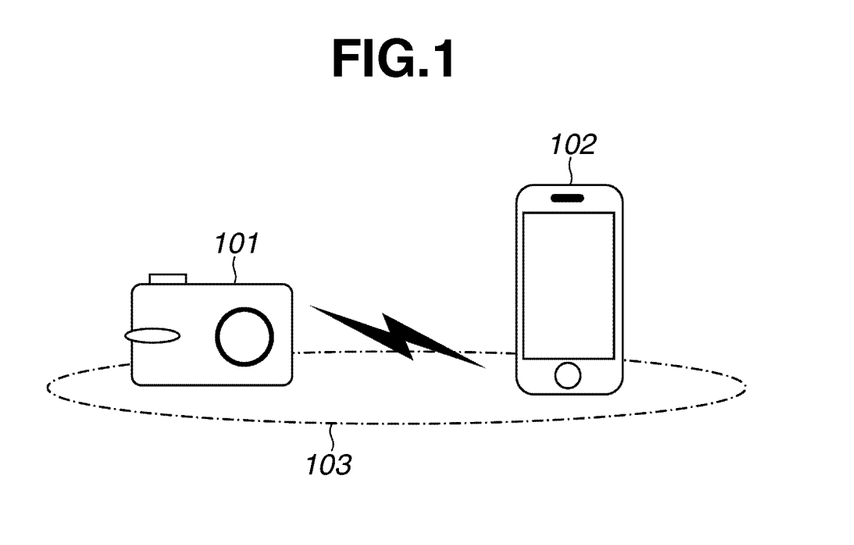
FIG. 1 is a diagram illustrating a network system configuration according to an exemplary embodiment.

FIG. 1 is a diagram illustrating a network configuration according to the present exemplary embodiment. The network illustrated in FIG. 1 includes a digital camera 101 and a smart device 102. In the first exemplary embodiment, the digital camera 101 and the smart device 102 have wireless communication functions, and can communicate with each other. The types of wireless communications include, for example, wireless local area network (LAN) that complies with Institute of Electrical and Electronic Engineers (IEEE) 802.11. In the first exemplary embodiment, it is assumed that by transmitting and displaying image data captured and retained by the digital camera 101 as an imaging apparatus, to and on the smart device 102 as a display device, users are allowed to browse the images on the smart device 102. The user confirms the image data of the digital camera 101 on the screen of the smart device 102, and become able to select the image data to be input into the smart device 102. The imaging apparatus or the display apparatus according to the first exemplary embodiment is one example of the communication apparatus, and the communication apparatus according to the present invention is not limited to these.

In FIG. 1, the digital camera 101 and the smart device 102 form a wireless LAN network 103. Further, the digital camera 101 and the smart device 102 each can search the wireless LAN network 103. The wireless LAN network 103 can be formed by an infrastructure mode defined in IEEE 802.11. In that case, one of the digital camera 101 and the smart device 102 operates as an access point (base station) to thereby construct the wireless network 103, and the other one participates in the wireless network 103 as a station (client). Alternatively, the wireless LAN network 103 can be also formed by an ad-hoc network defined in IEEE 802.11.

Figure 2:
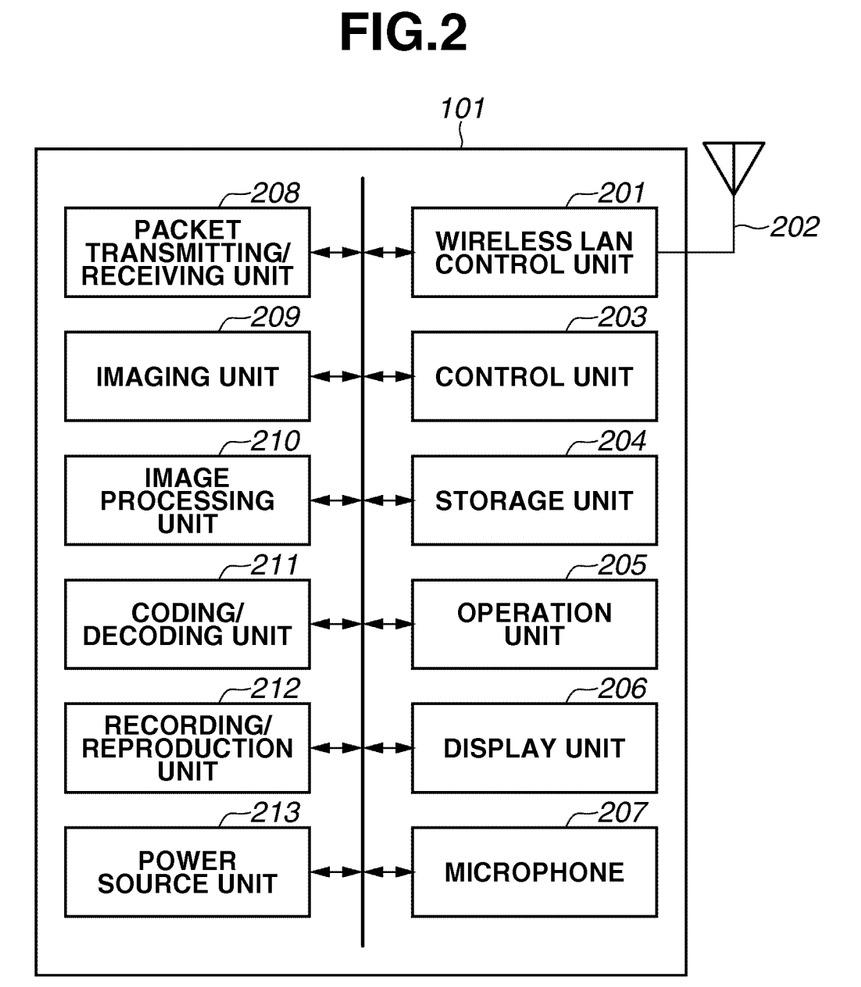
FIG. 2 is a hardware block diagram of a digital camera according to the exemplary embodiment.

FIG. 2 is a block diagram illustrating a hardware configuration of the digital camera 101 in the present exemplary embodiment.

A wireless LAN control unit 201 performs radio frequency (RF) control of the wireless LAN, wireless LAN communication processing, protocol processing related to drivers that perform various controls of wireless LAN communications that comply with IEEE 802.11 series or related to wireless LAN communications. An antenna 202 an antenna used for performing wireless LAN communications. A control unit 203 controls the entire digital camera 101 by executing a control program stored in a storage unit 204. The control unit 203 includes one or a plurality of processors such as a central processing unit (CPU) and a micro-processing unit (MPU). The storage unit 204 stores a control program executed by the control unit 203, and various kinds of information such as parameters necessary for communications. Also, the storage unit 204 stores image data captured and generated by an imaging unit 209, various data received from external apparatuses, and so on. Various types of operations described below are performed by the control unit 203 executing the control program stored in the storage unit 204. The storage unit 103 is composed of memories such as a read only memory (ROM), a random access memory (RAM), or various memories such as detachably attachable memories such as a memory card. An operation unit 205 is used to operate the digital camera 101. The operation unit 205 is composed of various buttons and a touch panel and so on. A display unit 206 performs various displays, and has the functions of enabling output of visually perceivable information like liquid crystal display (LCD) or light-emitting diode (LED), or sound output such as a speaker. A microphone 207 is used to input sound. A packet transmitting/receiving unit 208 transmits and receives packets involved in various communications. An imaging unit 209 captures an optical image of an object. An image processing unit 210 converts the captured image output from the imaging unit 209 into image data in a predetermined format, and executes various types of processing such as a luminance and a color correction of the image data. A coding/decoding unit 211 performs a predetermined high-efficiency coding (for example, discrete cosine transform (DCT) conversion, variable-length coding after quantization), on the image data output from the image processing unit 210. A recording/reproduction unit 212 records and reproduces compression-coded image data on a recording medium (not illustrated). A power source unit 213 supplies power to the digital camera 101.

Figure 3:
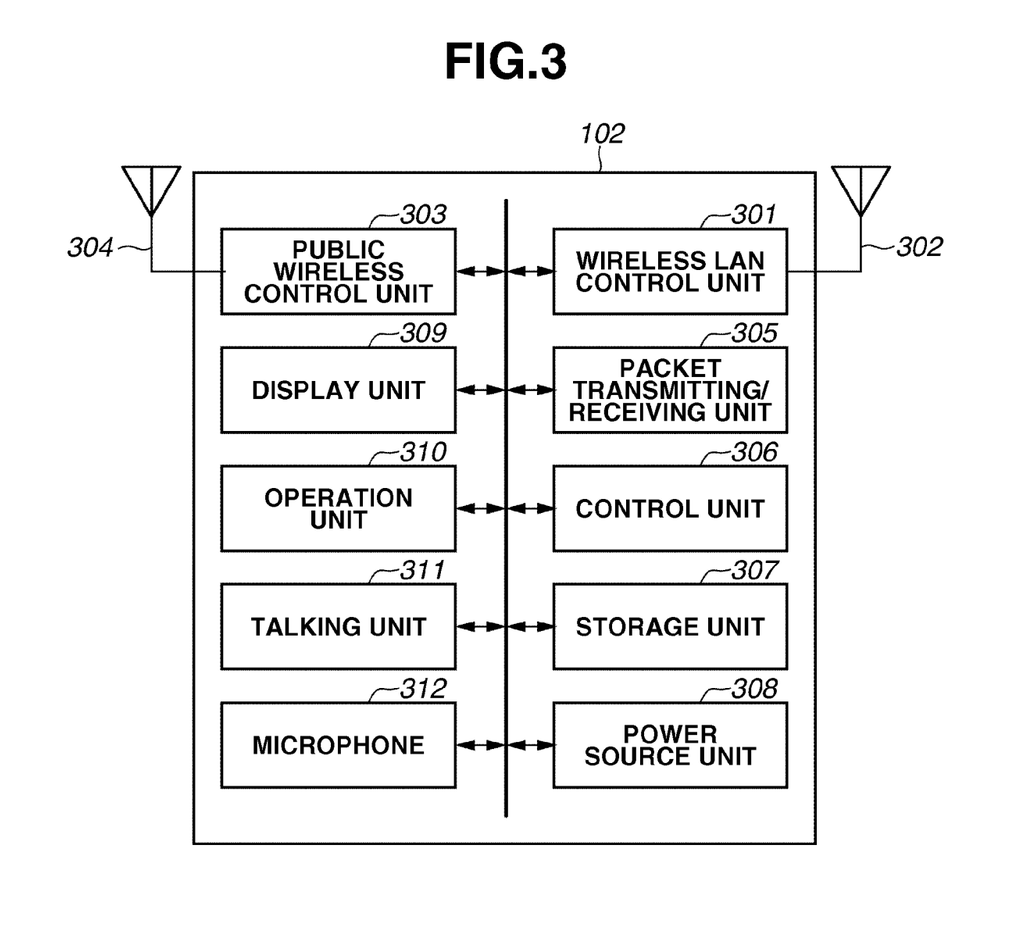
FIG. 3 is a hardware block diagram of a smart device according to the exemplary embodiment.

FIG. 3 is a block diagram illustrating a hardware configuration of the smart device 102 according to the present exemplary embodiment.

A wireless LAN control unit 301 performs RF control of the wireless LAN, wireless LAN communication processing, protocol processing related to drivers that perform various controls of wireless LAN communications that comply with IEEE 802.11 series or related to wireless LAN communications. An antenna 302 is used to perform wireless LAN communications. A public wireless control unit 303 performs RF control of public wireless communications, public wireless communication processing for performing public wireless communications, protocol processing related to drivers that perform various controls of public wireless communications or related to public wireless communications. The public wireless communication is the one that complies with, for example, international multimedia telecommunications (IMT) standard or long term evolution (LTE) standard. An antenna 304 is used to perform public wireless communications. A packet transmitting/receiving unit 305 transmits and receives packets involved in various communications. A control unit 306 controls the entire smart device 102 by executing a control program stored in a storage unit 307. The control unit 306 includes one or a plurality of processors such as a CPU, and an MPU. The storage unit 307 stores a control program executed by the control unit 306, and various pieces of information such as parameters necessary for communications. Also, the storage unit 307 stores the image data generated by the smart device 102, and various data received from an external apparatus. Various types of operations described below are performed by the control unit 306 executing the control program stored in the storage unit 307. The storage unit 307 is composed of memories such as ROM, and RAM, or various memories such as detachably attachable memories such as memory cards. A power source unit 308 supplies power to the smart device 102. A display unit 309 performs various displays and has the functions of enabling output of visually perceivable information like LCD or LED, or sound output such as a speaker. An operation unit 310 is used to operate the smart device 102. The operation unit 310 is composed of various buttons or a touch panel. A talking unit 311 and a microphone 312 are used when a user wants to talk.

The respective functional blocks illustrated in FIG. 2 and FIG. 3 may be provided by software. These respective functional blocks have mutual relationship on software or hardware basis. Further, these respective functional blocks are one example, and a plurality of function blocks may constitute one functional block, or either functional block may be further divided into a plurality of functional blocks. Further, the digital camera 101 and the smart device 102 may be provided with functional blocks other than the functional blocks illustrated in FIG. 2 and FIG. 3.

As described above, in the present exemplary embodiment, there is assumed a use case where, by transmitting and displaying image data containing still images and moving images captured and retained by the digital camera 101 to and on the smart device 102, the user browses the images in the smart device 102. The user of the smart device 102 can check the image data of the digital camera 101 on the screen of the smart device 102, and can select images to be actually input into the smart device 102.

Figure 4:
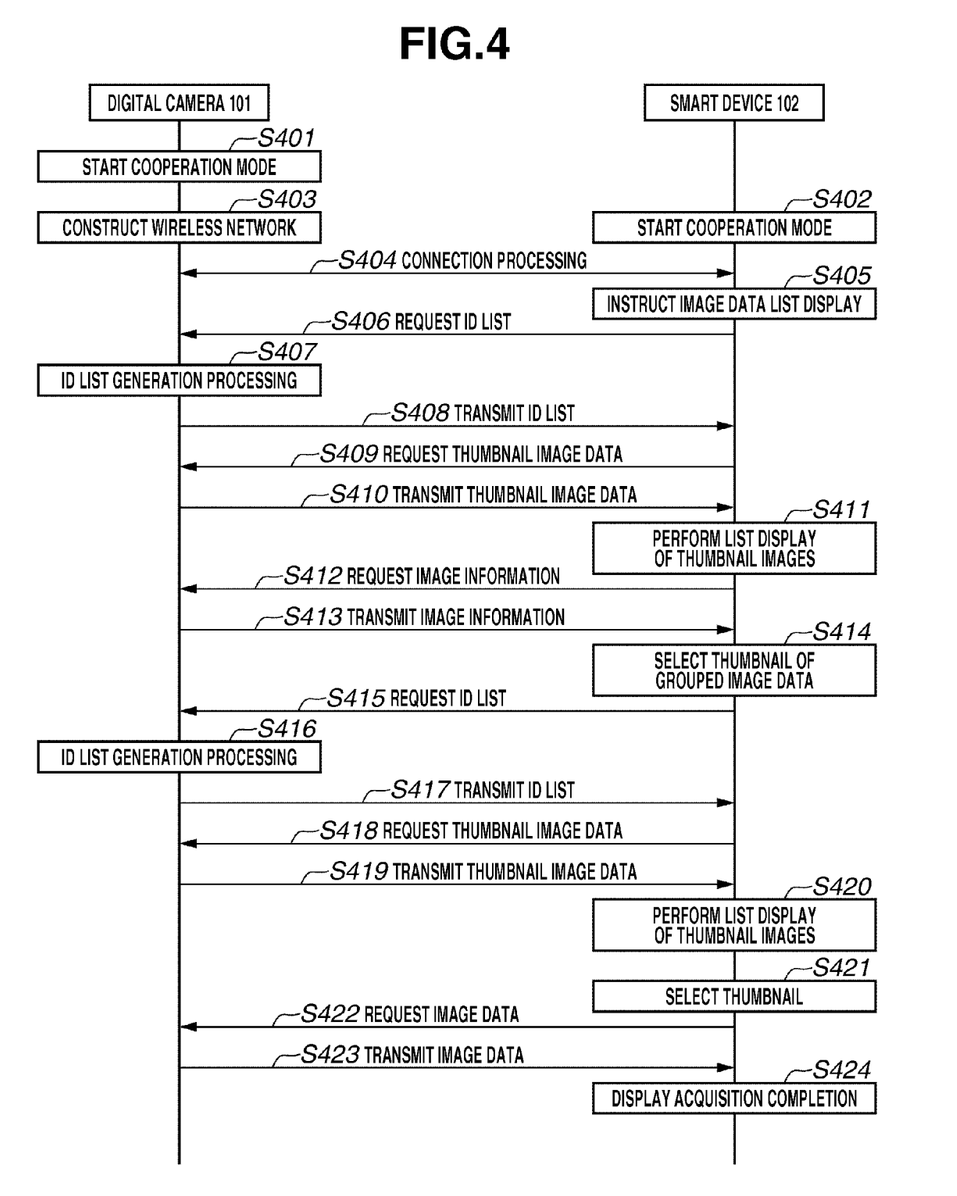
FIG. 4 is a sequence diagram illustrating operations of the digital camera and the smart device according to the exemplary embodiment.

FIG. 4 is a sequence diagram illustrating processing executed between the digital camera 101 and the smart device 102 according to the present exemplary embodiment. The processing illustrated in FIG. 4 is performed by executing the program stored in the storage unit 204 or in the storage unit 307, by the control unit 203 of the digital camera 101 or by the control unit 306 of the smart device 102.

In FIG. 4, first, in step S401 and in step S402, the digital camera 101 and the smart device 102 start a cooperation mode in response to operations by the user. In the example of FIG. 4, a case where the digital camera 101 operates as an access point is assumed. Therefore, in step S403, the digital camera 101 constructs, when the cooperation mode is started, a wireless network. Thereafter, in step S404, the smart device 102 participates in the wireless network constructed by the digital camera 101, thereby establishing connection via the wireless LAN between the digital camera 101 and the smart device 102.

When the connection via the wireless LAN is completed, then in step S405, the smart device 102 receives a user instruction to perform list display of the image data retained in the digital camera 101. In step S406, according to the user instruction, the smart device 102 makes a request to the digital camera 101 for a data list of all the image data retained in the digital camera 101. The processing in step S405 may be omitted, and the data list may be requested automatically based on completion of the connection between the digital camera 101 and the smart device 102. Since the digital camera manages all the image data by assigning unique identification information (IDs) to all the image data, the smart device 102 makes a request for an ID list of all the image data in this case. In step S407, the digital camera 101, which has received the request, generates the ID list of all the image data. In the generation processing, regarding the grouped image data, only IDs of representative image data thereof are included in the ID list. Furthermore, information of the number indicating how many pieces of the image data other than representative image data is contained in the group is included in the ID list.

It is assumed that, for example, the image data for 20 frames is retained in the digital camera 101, and IDs from 1 to 20 have been assigned thereto in order. Further, it is assumed that the data from ID3 to ID13 have been grouped, and in addition, the data from ID14 to ID20 have been grouped. In that case, information of "ID1", "ID2", "ID3 (10)", and "ID14(6)" will be contained in the ID list of the image data generated by the digital camera 101. In this case, a number in the parenthesis indicates the number of pieces of the image data other than the representative image data contained in the group. The digital camera 101 may transmit information of (0) indicating that these image data are not grouped along with the information of ID1 and ID2. Further, a group of the image data may be automatically generated, based on information containing an imaging mode such as continuous shooting, an imaging timing or date and time of imaging, an imaging position, or may be the one that is manually generated by a user. Alternatively, image data generated by an imaging operation in a predetermined specific mode may be automatically grouped.

In step S408, the digital camera 101 transmits, to the smart device 102, an ID list generated in response to a data list request from the smart device 102. In other words, the digital camera 101 transmits, to the smart device 102, identification information of the representative data of the group and information indicating the number of pieces of the image data that belongs to the group.

In step S409, the smart device 102, which has acquired an ID list, requests the digital camera 101 to generate thumbnail image data corresponding to respective image data indicated by the ID list. All IDs contained in the ID list are designated in this request. More specifically, in a case of the above-described example, ID1, ID2, ID3, and ID14 are designated in the request for the thumbnail image data. In step S410, the digital camera 101, which has received this request, generates thumbnail image data of the image data corresponding to the designated IDs, and transmits the generated thumbnail image data to the smart device 102. The timing at which the thumbnail image data is generated may be later than the timing at which the thumbnail image data is requested from the smart device 102, or the thumbnail image data may be generated in advance. If generated in advance, the digital camera 101 can transmit the thumbnail image data earlier to the smart device 102.

Figure 5A:
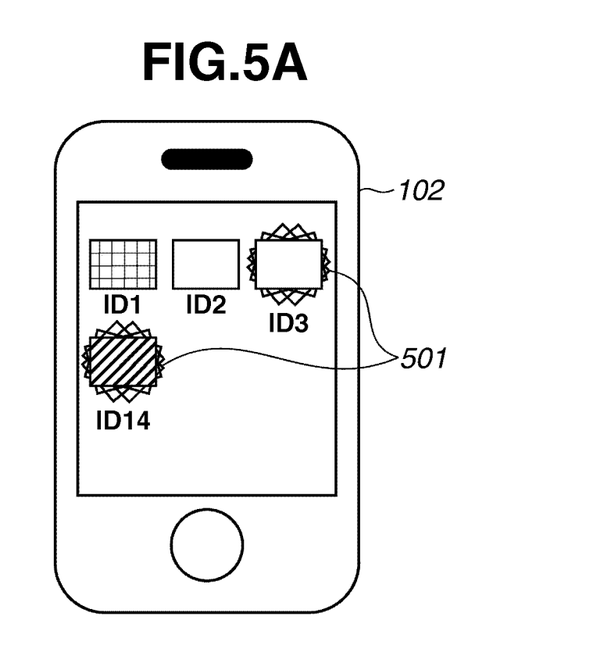
FIGS. 5A & 5B are examples of screens displayed on the smart device according to the exemplary embodiment.
Figure 5B:
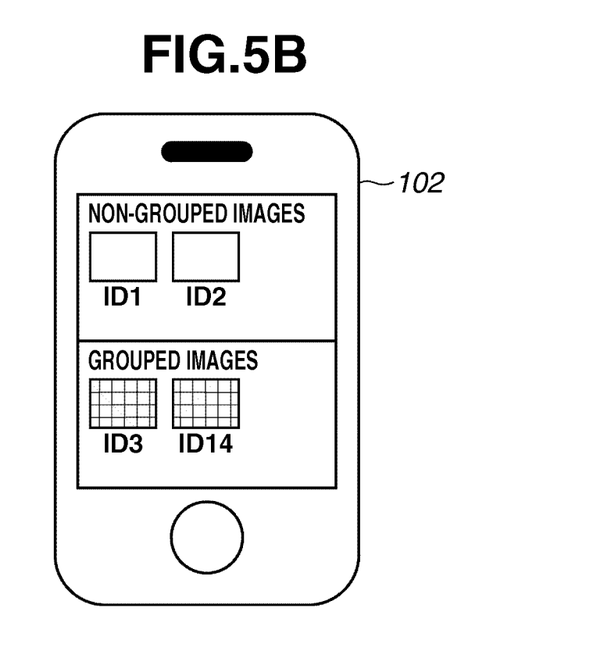

In step S411, the smart device 102, upon receiving the thumbnail image data, performs list display of the thumbnail images on the display unit 309, based on the received thumbnail image data. FIG. 5A is an example of the list display of the thumbnail images to be displayed on the display unit 309 of the smart device 102. In the example of FIG. 5A, the thumbnail images corresponding to four pieces of the image data of ID1, ID2, ID3, and ID14 are displayed. Further, because the image data of ID3 and ID14 are the grouped images, they are displayed in a display form easily recognizable to the user that they are grouped (recognizable that different related images exist). The display method illustrated in FIG. 5A is one example and, for example, as illustrated in FIG. 5B, non-grouped image data and grouped image data may be displayed separately in different regions for display, or may be displayed using another display method. In any of these display methods, it is desirable to display the non-grouped image data and the grouped image data in an identifiable manner. Though not illustrated in FIGS. 5A and 5B, in the thumbnail images of the grouped image data, information indicating a number of the images contained in the group may be displayed together.

In step S412, the smart device 102, after displaying the thumbnail images, makes a request for image information about respective image data. In this request, all the IDs contained in the ID list received in step S408 are designated. In other words, in the above-described example, ID1, ID2, ID3, and ID14 are designated in the request for the image information. The image information refers to information of, but not limited to, resolutions, sizes, and parameters when image-captured, of the images. In response to the request, in step S413, the digital camera 101 transmits, as a response, image information of the respective image data corresponding to the designated IDs to the smart device 102.

When the thumbnail images are displayed in the smart device 102 as illustrated in FIGS. 5A and 5B, then in step S414, the smart device 102 receives user selection of a thumbnail image of the grouped image data. In other words, in the example of FIG. 5A, the smart device 102 receives either of the thumbnail images 501, which is selected by the user. In step S415, the smart device 102, upon receiving selection by the user in step S414, makes a request to the digital camera 101 for a data list relating to the image data of a group to which the image data corresponding to the selected thumbnail image belongs. Specifically, the digital camera 101 notifies the smart device 102 of an ID corresponding to the thumbnail image selected in step S414, and makes a request for IDs of other image data contained in the group. In the above-described example, in a case where the thumbnail image of the image data of ID3 is selected by the user in step S414, the smart device 102 makes a request to the digital camera 101 for the ID list by designating ID3. In step S416, the digital camera 101, which has received the request, generates an ID list corresponding to the image data of the group to which the image data of the designated ID belongs. In the above-described example, information of ID3 through ID13 which are IDs corresponding to the image data of the group to which the image data of ID3 belongs is generated as an ID list. In step S417, the digital camera 101 transmits the generated ID list to the smart device 102, in response to the data list request in which IDs have been designated from the smart device 102.

In step S418, the smart device 102, when acquiring the ID list, makes a request to the digital camera 101 for the thumbnail image data corresponding to the respective image data indicated by the ID list. In the request, the IDs contained in the ID list received in step S417 are designated. In the request in step S418, only IDs excluding the IDs corresponding to already-acquired thumbnail images may be designated. More specifically, in the above-described example, the thumbnail images may be requested by designating ID3 through ID13. Alternatively, the thumbnail images may be requested by designating ID4 through ID13, excluding the already-acquired ID3.

In step S419, the digital camera 101, which has received the request, generates thumbnail image data of the image data corresponding to the designated IDs, and transmits the generated thumbnail image data to the smart device 102. The timing at which the thumbnail image data is generated may be later than the timing at which the thumbnail image data is requested from the smart device 102, and the thumbnail image data may be generated in advance. If the thumbnail images have been generated in advance, the thumbnail image data can be transmitted earlier to the smart device 102.

Figure 6:
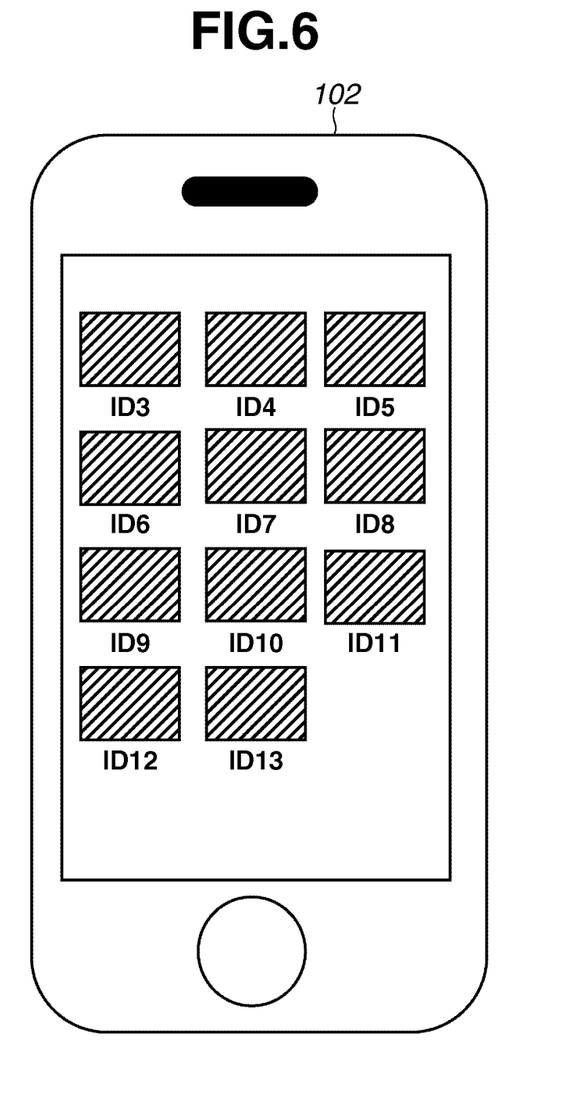
FIG. 6 is an example of a screen displayed on the smart device according to the exemplary embodiment.

In step S420, the smart device 102, upon receiving the thumbnail image data, performs list display of the thumbnail images on the display unit 309, based on the received thumbnail image data. FIG. 6 is an example of the list display of the thumbnail images to be displayed on the display unit 309 of the smart device 102. In the example of FIG. 6, the thumbnail images corresponding to the image data of ID3 through ID13 which are the image data of the group to which the image data of ID3 belongs are displayed.

When the thumbnail images are displayed in the smart device 102, the smart device 102 receives the thumbnail image selected by the user. In step S421, when either (one or a plurality of) thumbnail image is selected by the user from among the displayed thumbnail images, then in step S422, the smart device 102 designates an ID of the corresponding image data and makes a request to the digital camera 101 for the image data. In step S423, the digital camera 101, which has received this request, transmits the image data corresponding to the designated ID to the smart device 102.

In step S424, the smart device 102, upon receiving the image data from the digital camera 101, shows a display indicating that reception of the image data is completed on the display unit 309.

In the above description, although the processing in steps S415 through S417 are performed after the thumbnail image has been selected in step S414, the processing in steps S415 through S417 may be performed before step S414. In this case, the IDs designated in step S415 are all the IDs of the grouped image data, and in the above-described example, ID3 and ID14 will be designated. Further, if the thumbnail of the image data, which has not been grouped, is selected by the user as a result of the thumbnail image display in step S411, the processing in steps S414 through S420 will be omitted and the processing from step S421 will be executed.

Figure 7:
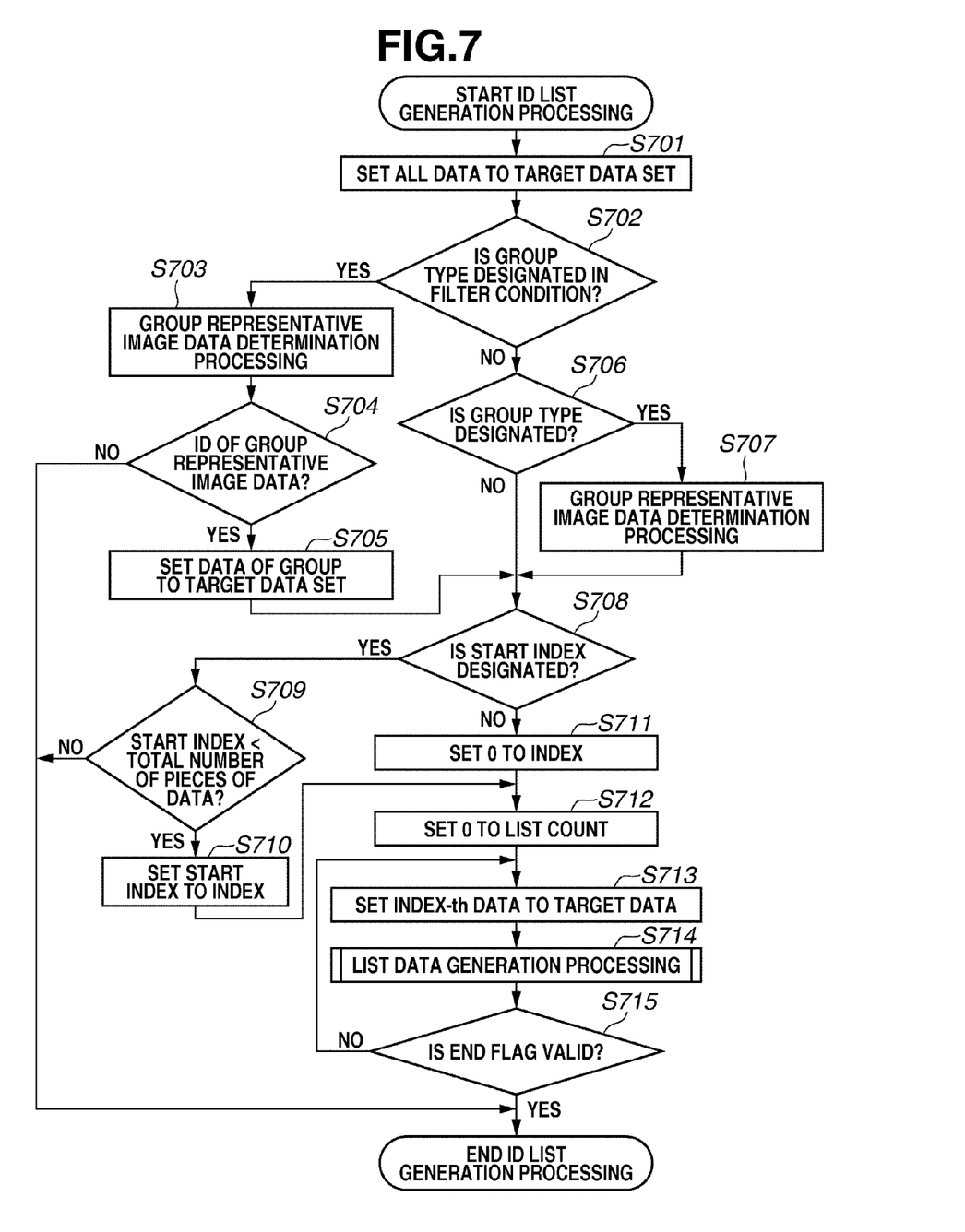
FIG. 7 is a flowchart illustrating processing executed by the digital camera according to the exemplary embodiment.
Figure 8:
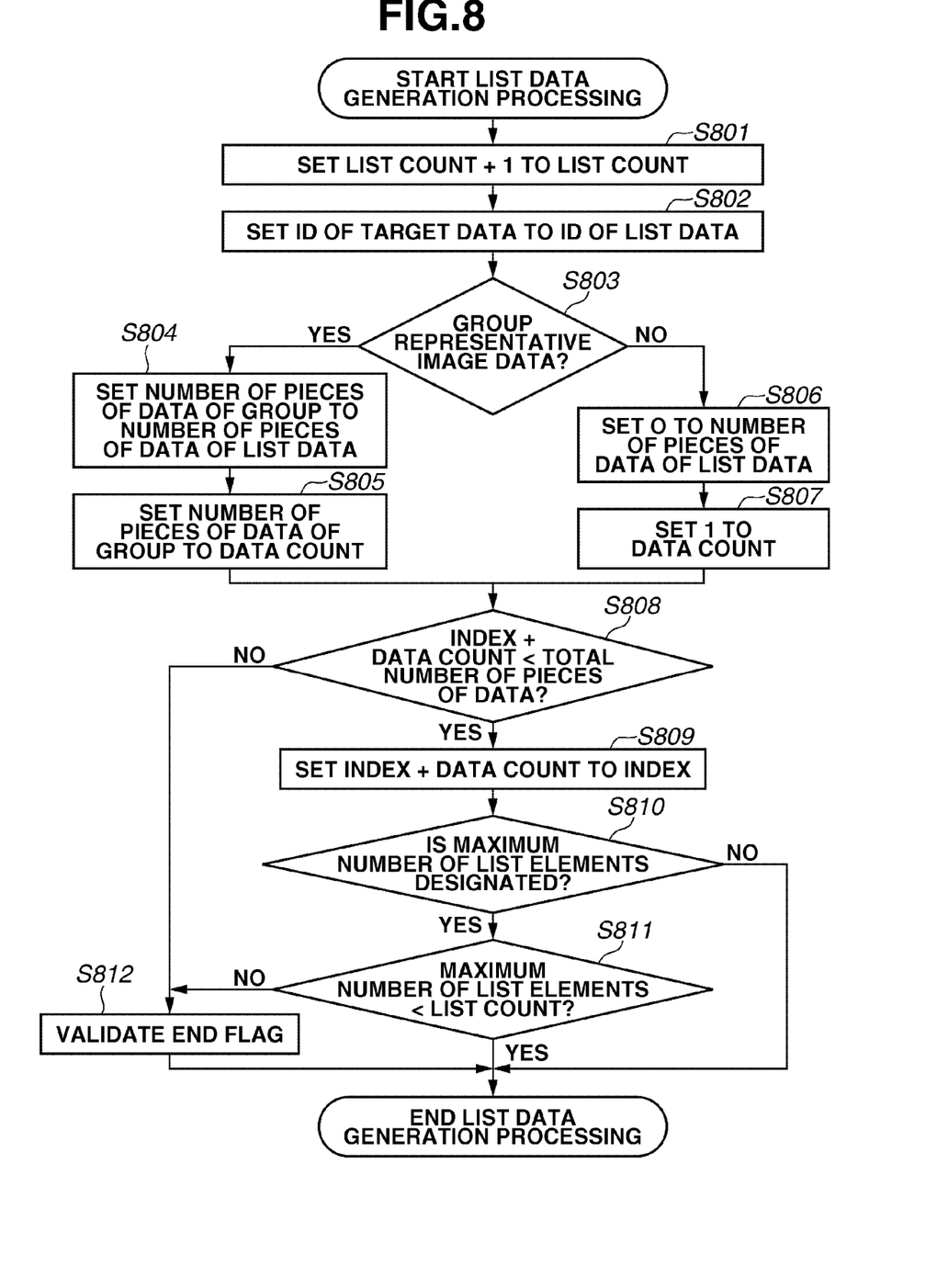
FIG. 8 is a flowchart illustrating processing executed by the digital camera according to the exemplary embodiment.

Next, referring to FIG. 7 and FIG. 8, a specific example of ID list generation processing executed in the digital camera 101 in steps S407 and S416 of FIG. 4 will be described. However, the processing of FIG. 7 and FIG. 8 is an example of the ID list generation processing, and the processing in steps S407 and S416 of FIG. 4 is not limited to the processing in FIG. 7 and FIG. 8. The respective steps illustrated in FIG. 7 and FIG. 8 are performed by executing a program stored in the storage unit 204 by the control unit 203 of the digital camera 101.

FIG. 7 is a flow that is executed when the ID list generation processing starts, in the digital camera 101. In the present exemplary embodiment, it is assumed that the ID list generation processing is executed when the ID list request has been received from the smart device 102, but it is not limited to this. For example, the ID list generation processing may be executed in response to the power-on of the digital camera 101, or the start of the cooperation mode.

In step S701, the control unit 203 sets all the image data retained by the digital camera 101, as a target data set of the ID list generation processing, and the operation proceeds to step S702. In step S702, the control unit 203 determines whether a group type is designated to the filter condition of the ID list request. If a group is designated to the filter condition (YES in step S702), the operation proceeds to step S703, and if a group is not designated (NO in step S702), the operation proceeds to step S706. In step S703, the control unit 203 performs group representative data determination processing. The group representative data determination processing refers to processing for determining representative data, from among one or a plurality of pieces of grouped image data in the target data set according to the designated group type. The group type refers to information for identifying a group such as imaging mode and imaging timing, date and time of imaging, and imaging position. Further, in the present exemplary embodiment, the group representative data is assumed to be image data that has a minimum ID value among the image data that constitutes a group. However, the group representative data may be, but not limited to, image data that has a maximum ID value, image data that has the newest date and time of imaging, image data that has the oldest date and time of imaging, or randomly selected image data. In step S704, the control unit 203 determines whether an ID of the representative data is designated for an ID list request. If an ID of the representative data is designated (YES in step S704), the operation proceeds to step S705, and if not designated (NO in step S704), the ID list generation processing ends as an error. In step S705, the control unit 203 sets one or a plurality of pieces of image data that constitutes a group to which the representative data designated by the ID list request belongs, to the target data set of the ID list generation processing, and the operation proceeds to step S708.

In step S706, the control unit 203 determines whether a group type is designated in the ID list request. If the group type is designated (YES in step S706), the operation proceeds to step S707, and if not designated (NO in step S706), the operation proceeds to step S708. In step S707, the control unit 203 performs group representative data determination processing. In step S708, the control unit 203 determines whether a start index is designated in the ID list request. If the start index is designated (YES in step S708), the operation proceeds to step S709, and if not designated (NO in step S708), the operation proceeds to step S711. In step S709, the control unit 203 determines whether the start index is less than a total number of pieces of the data of the target data set. If the start index is less than a total number of pieces of the data (YES in step S709), the operation proceeds to step S710, and if equal to or greater than the number of pieces of data (NO in step S709), the ID list generation processing ends as an error. In step S710, the control unit 203 sets the start index to the index, and the operation proceeds to step S712. In step S711, the control unit 203 sets 0 to the index, and the operation proceeds to step S712. In step S712, the control unit 203 sets 0 to the list count, and the operation proceeds to step S713. In step S713, the control unit 203 sets index-th image data of the target data set, as target data of the list data generation processing, and the operation proceeds to step S714. In step S714, the control unit 203 performs list data generation processing. Hereinbelow, the list data generation processing will be described with reference to FIG. 8.

First, in step S801, the control unit 203 sets the list count to "list count+1", and the operation proceeds to step S802. In step S802, the control unit 203 sets the ID of the target data, as an ID of the list count-th list data, and the operation proceeds to step S803. In step S803, the control unit 203 determines whether the target data is group representative data. If the target data is the group representative data (YES in step S803), the operation proceeds to step S804, and if not the group representative data (NO in step S803), the operation proceeds to step S806. In step S804, the control unit 203 sets the number of pieces of data that constitutes a group to which the representative data belongs, to the number of pieces of data of the list count-th list data, and the operation proceeds to step S805. In step S805, the control unit 203 sets the number of pieces of data that constitutes the group to which the representative data belongs, to the data count, and the operation proceeds to step S808. In step S806, the control unit 203 sets 0 to the number of pieces of data of the list count-th list data, and the operation proceeds to step S807. In step S807, the control unit 203 sets 1 to the data count, and the operation proceeds to step S808. In step S808, the control unit 203 determines whether a sum of the values of the index and the data count is less than the total number of pieces of data of the target data set. If the sum of values is less than the total number of pieces of the data (YES in step S808), the operation proceeds to step S809, and if the sum of values is equal to or greater than the total number of pieces of the data (NO in step S808), then in step S812, end flag is validated, and the list data generation processing ends. In step S809, the control unit 203 sets a sum of values of the index and the data count to the index, and the operation proceeds to step S810. In step S810, the control unit 203 determines whether the maximum number of list elements is designated for the ID list acquisition request. If the maximum number of list elements is designated (YES in step S810), the operation proceeds to step S811, and if not designated (NO in step S810), the list data generation processing ends. In step S811, the control unit 203 determines whether the maximum number of list elements is less than the list count. If the maximum number of list elements is less than the list count (YES in step S811), the list data generation processing ends, and if equal to or greater than the list count (NO in step S811), then in step S812, end flag is validated, and the list data generation processing ends.

In step S715, the control unit 203 determines whether the end flag is valid. If the end flag is valid (YES in step S715), the ID list generation processing ends, and if not valid (NO in step S715), the operation returns to step S713 and the list data generation processing continues to be performed.

In the present processing, determination of whether data of the group is set to the target data set of the ID list generation processing, is determined depending on whether an ID of the representative data is designated, but it may be determined depending on whether an ID of separate data that constitutes the group is designated. In that case, data of a group to which the designated data belongs is set, as a target data set of the ID list generation processing. Further, after setting the data of the group to the target data set, it is determined whether a group type is designated. Then, if designated, the group representative data determination processing may be executed once again. With this operation, unnecessary response of the ID list can be avoided, in a case where one or a plurality of pieces of data that further constitutes the group is present among the data of the group.

In the digital camera 101 according to the present exemplary embodiment, even if representative image data has been deleted, the ID of the representative image data is kept retained without deleting it. Thereby, even when the data list request, in which the ID of the representative image data is designated, is received from the smart device 102, after the representative image data has been deleted, it is possible to generate an ID list of the group.

In the present exemplary embodiment, when starting the cooperation mode, although the digital camera 101 constructs a wireless network, and the smart device 102 participates in the wireless network, another configuration may be used. For example, the smart device 102 constructs the wireless network, and the digital camera 101 participates in the wireless network. Alternatively, role determination processing may be performed for determining whether to play a role of operating as a base station that constructs the wireless network between the digital camera 101 and the smart device 102, or to play a role of operating as a client that participates in the network constructed by the base station may be performed. In that case, settings of communication parameters for the role determination processing and wireless communication may be performed, by using, for example, a protocol of Wi-Fi Direct that is the standard devised by Wi-Fi Alliance. The communication parameters that are set at this time, include service set identifier (SSID) as an identifier that identifies a network of wireless LAN, encryption method, encryption key, authentication method, and authentication key. Further, the digital camera 101 and the smart device 102 according to the present exemplary embodiment can also operate as a base station that constructs wireless network, and can also operate as a client that participates in the wireless network constructed by other base station.

In the present exemplary embodiment, if a thumbnail of grouped image data is selected by a user, acquisition of an ID list within the group is performed, but different processing may be performed. Different processing include, for example, acquiring image data of representative image, acquiring image data of all the images within a group to which the representative image belongs.

In the present exemplary embodiment, representative image data is one out of a plurality of pieces of the image data contained in the group, but may be two or more if smaller than the number of pieces of all the image data contained in the group.

Although the smart device 102 has been configured to acquire image information of respective IDs after performing list display of the thumbnail images, it may acquire the image information at different timing, but it is not limited to this.

As described above, by executing the present exemplary embodiment, processing load can be reduced, when displaying a thumbnail image list of the image data retained in the digital camera 101, on the smart device 102.

The above-described exemplary embodiment represents one example for implementing the present invention, and various variations and modifications can be made without departing from spirit of the present invention.

The digital camera 101 or the smart device 102 according to the above-described exemplary embodiment is one example of a communication apparatus, and the communication apparatus is not limited to the digital camera 101 or the smart device 102. A personal computer (PC) or a tablet terminal may be used, and besides, an image processing apparatus such as a printer or a copying machine, a scanner, a facsimile (FAX), a multifunction peripheral, a digital home electrical appliance such as a television (TV) or a recorder may be also used. Further, the present invention can be implemented in communications between the same kinds of the communication apparatuses.

Further, in the above-described exemplary embodiment, the wireless LAN that complies with IEEE 802.11 has been described by way of example. The present invention, however, may also be implemented in other wireless communications such as wireless universal serial bus (USB), multi-band orthogonal frequency division multiplexing alliance (MBOA), Bluetooth (registered trademark), ultra wide band (UWB), ZigBee (registered trademark). Also, the present exemplary embodiment may be implemented in wired communication media such as wired LAN or USB. Further, the UWB includes wireless USB, wireless 1394, WINET, and so on.

Furthermore, the present exemplary embodiment can also be realized by executing the following processing. Specifically, software (i.e., program) that realizes the above-described functions of the exemplary embodiment is supplied to a system or an apparatus via a network or various storage media, and a computer (or the CPU or MPU and/or the like) of the system or the apparatus reads out and executes the program code. In that case, the program, and the storage medium that has stored the program will constitute the present invention.

According to the present exemplary embodiment, efficiency can be improved when the communication apparatus acquires and displays desired image data from other communication apparatus storing a plurality of pieces of image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and function.

This application claims the benefit of Japanese Patent Application No. 2013-012132 filed Jan. 25, 2013, which is hereby incorporated by reference herein in its entirety.

What is claimed is:

1. A communication apparatus comprising:
   a storage unit configured to store a plurality of pieces of image data;
   a first determination unit configured to determine a role of whether the communication apparatus operates as an apparatus that constructs a wireless network, or operates as an apparatus that participates in a constructed wireless network, by communicating with another communication apparatus;
   a receiving unit configured to receive a request signal for requesting information of the plurality of pieces of image data from said another communication apparatus; and
   a transmission unit configured to,
   1) in a case where the requested signal received by the receiving unit designates ID information of first image data and information of image data associated with the first image data is requested, transmit information of the image data associated with the first image data,
   2) in a case where the requested signal does not designate ID information of image data, transmit ID information of representative image data in a group of grouped image data, not transmit ID information of image data other than the representative image data in the group, and transmit ID information of image data that is not grouped.

2. The communication apparatus according to claim 1, wherein the transmission unit transmits thumbnail image data corresponding to the image data, for display in said another communication apparatus, in response to the request signal.

3. The communication apparatus according to claim 1, further comprising:
   a construction unit configured, if it is determined that the communication apparatus operates as an apparatus that constructs a network by the determination unit, to construct the network; and
   a participation unit configured, if it is determined that the communication apparatus operates as an apparatus that participates in a constructed network, by the determination unit, to participate in the network constructed by the other communication apparatus.

4. The communication apparatus according to claim 1, further comprising:
   an imaging unit,
   wherein the image data stored in the storage unit is image data based on images captured by the imaging unit.

5. The communication apparatus according to claim 4, wherein even if the representative image data is deleted from the storage unit, the ID information of the representative image data is kept retained.

6. The communication apparatus according to claim 1, wherein the communication apparatus communicates with said another communication apparatus via a wireless LAN that complies with one of IEEE 802.11 series.

7. The communication apparatus according to claim 1, the group unit groups at least part of the plurality of pieces of image data if the type of the request signal is the predetermined type, and does not group if the type of the request signal is not the predetermined type.

8. The communication apparatus according to claim 1, further comprising:
   a second determination unit configured to determine whether a type of the request signal is a predetermined type, wherein the transmission unit performs a transmission processing based on the determination result of the second determination unit.

9. The communication apparatus according to claim 1, wherein, in a case where the requested signal doesn't designate ID information of image data, the transmission unit transmits information indicating the number of pieces of image data belonging to a group of representative image data together with ID information of the representative image data.

10. A control method for a communication apparatus, comprising:
    storing a plurality of pieces of image data;
    determining a role of whether to operate as an apparatus that constructs a wireless network, or to operate as an apparatus that participates in a constructed wireless network by communicating with another communication apparatus;
    receiving a request signal for requesting information of the plurality of pieces of image data from said another communication apparatus; and
    1) in a case where the requested signal received designates ID information of first image data and information of image data associated with the first image data is requested, transmitting information of the image data associated with the first image data,
    2) in a case where the requested signal does not designate ID information of image data, transmit ID information of representative image data in a group of grouped image data, not transmit ID information of image data other than the representative image data in the group, and transmit ID information of image data that is not grouped.

11. A non-transitory storage medium storing a computer executable instructions for causing a computer to implement a method, the method comprising:
    storing a plurality of pieces of image data;
    determining a role of whether to operate as an apparatus that constructs a wireless network, or to operate as an apparatus that participates in a constructed wireless network by communicating with another communication apparatus;
    receiving a request signal for requesting information of the plurality of pieces of image data from said another communication apparatus; and
    1) in a case where the requested signal received designates ID information of first image data and information of image data associated with the first image data is requested, transmitting information of the image data associated with the first image data,
    2) in a case where the requested signal does not designate ID information of image data, transmit ID information of representative image data in a group of grouped image data, not transmit ID information of image data other than the representative image data in the group, and transmit ID information of image data that is not grouped.

* * * * *